United States Patent [19]
Jenkins et al.

[11] 3,857,278
[45] Dec. 31, 1974

[54] METHOD AND APPARATUS FOR LEAK TESTING SEALED CONTAINERS

[76] Inventors: Anthony Jenkins; Colin Jeffrey Vincett, both c/o Analytical Instruments Ltd., Green Lane, Fowlmere, Royston, Hertfordshire, England

[22] Filed: Jan. 29, 1973

[21] Appl. No.: 327,823

[30] Foreign Application Priority Data
Feb. 1, 1972 Great Britain ............... 4585/72

[52] U.S. Cl. ............... 73/40.7, 73/41, 73/49.3
[51] Int. Cl. ............... G01m 3/04
[58] Field of Search ............ 73/40.7, 41, 45.4, 49.3, 73/52, 45, 45.1, 45.2

[56] References Cited
UNITED STATES PATENTS
3,302,449  2/1967  Roberts ............... 73/49.3 X
3,486,365  12/1969  Briggs ............... 73/40.7
3,672,207  1/1971  Cramp et al. ............... 73/40.7

FOREIGN PATENTS OR APPLICATIONS
1,063,006  3/1967  Great Britain ............... 73/49.3

Primary Examiner—James J. Gill
Attorney, Agent, or Firm—Woodhams, Blanchard & Flynn

[57] ABSTRACT

A method and apparatus for leak testing sealed containers. The containers are passed through an open ended, elongate chamber and over a portion of the length of the chamber remote from its ends the containers are enveloped in an atmosphere of carrier gas. This portion of the chamber communicates with a detector sensitive to any leakage from the containers and gaseous leakage together with carrier gas is drawn into the detector. The detector detects faulty containers and can control a reject means for isolating identified faulty containers emerging from the chamber.

16 Claims, 1 Drawing Figure

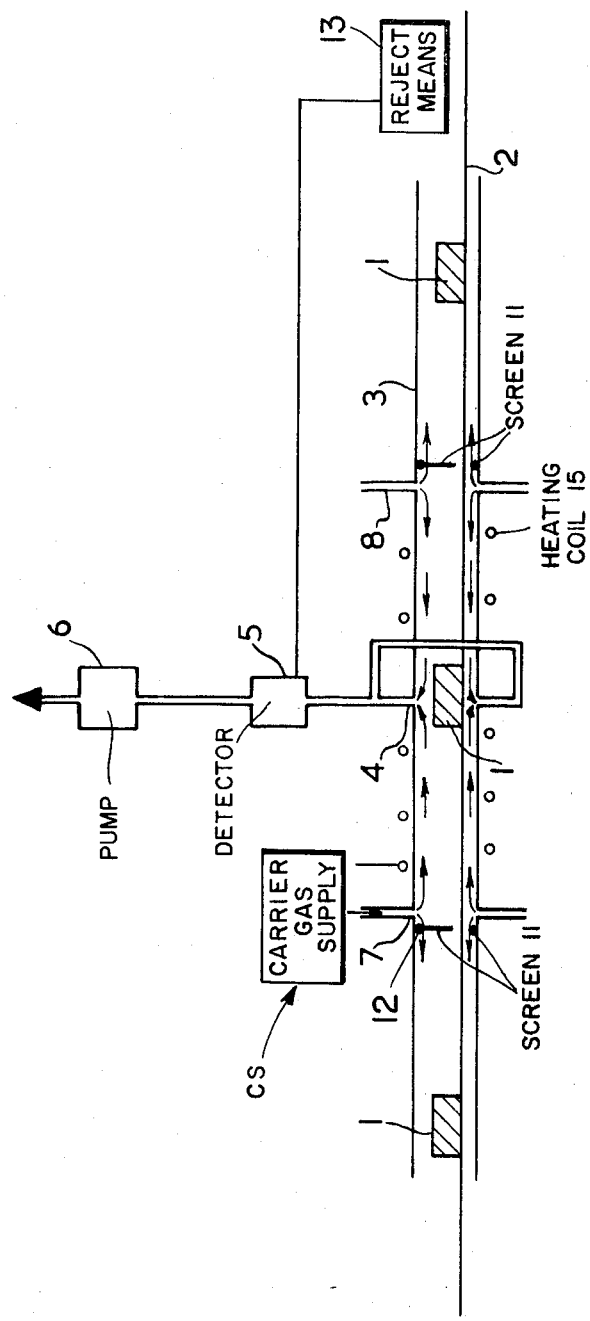

METHOD AND APPARATUS FOR LEAK TESTING SEALED CONTAINERS

The present invention concerns a method and apparatus for leak testing sealed containers.

In an existing method and apparatus for leak testing a sealed container is placed in an enclosure. The enclosure is first purged of any residual gas with which the container is filled and then a carrier gas is passed through the enclosure. The carrier gas exhausted from the enclosure is analysed for any trace of gas which may have leaked from the container.

The existing method is slow and requires enclosures to conform to the shapes and sizes of containers being tested.

According to one aspect of the present invention a method of leak testing sealed containers comprises establishing an atmosphere of a carrier gas within a portion of a chamber remote from its ends, passing a succession of containers through the chamber and introducing carrier gas together with any gaseous leakage from each container passing through the portion into a detector sensitive to the leakage.

The chamber is open at its ends and conveniently screens or shutters can be arranged to non-sealingly close the ends of the chamber portion containing an established atmosphere of the carrier gas. The screens or shutters are particularly useful when the cross-sectional area of the chamber is large in comparison with its length.

If necessary the chamber can be heated to increase the temperature and hence the pressure within the containers passing along the chamber.

According to another aspect of the present invention an apparatus for leak testing sealed containers comprises an open ended elongate chamber having an outlet port situated at a position remote from its ends in communication with a leak sensitive detector and carrier gas inlet ports at opposite sides of and spaced from the outlet port to create an uninterrupted atmosphere of carrier gas over the region of the chamber between the inlet ports.

Preferably the apparatus includes means for rejecting an identified leaking container from the containers passing through the chamber.

One embodiment of the invention will now be described, by way of example, with reference to the accompanying diagrammatic drawing.

Sealed containers 1 to be tested for leaks are carried by a conveyor 2 through a tube 3. The tube 3 is long compared to its internal diameter and preferably its length is at least an order of magnitude greater than its internal diameter.

A number of ports 4 are spaced around the periphery of the tube 3 at or adjacent its mid-length position and these ports are connected together to lead to a detector 5. The detector 5, in turn, is connected to a pump 6 which can exhaust to the atmosphere.

A series of peripherally spaced ports 7 and 8 are provided upstream and downstream respectively of the ports 4. These ports 7 and 8 can be arranged at a distance equivalent to from three to four tube diameters from the ports 4. A flow of a carrier gas or gases is introduced into the tube 3 through the ports 7 and 8.

The flow of carrier gas through the ports 7 and 8 is arranged to be in excess of the gas flow drawn from the tube 3 through the ports 4 by the pump 6. There is a net flow of gas out of each open end of the tube 3 and the carrier gas flow is indicated by the arrows in the drawing. Over that length of the tube 3 between the ports 7 and 8 the flow of carrier gas is towards the ports 4 so that a container 1 in passing along this length of the tube is swept by a flow of carrier gas, all of which is being sucked into the detector by way of the ports 4. Thus any gas leaking from the container will be conveyed with the carrier gas into the detector.

Certain detectors, for example an electron capture detector, are adversely affected by constituents of air and in such cases it is necessary that the carrier gas does not contain such constituents. Further the tube 3, the ends of which are open, must be sufficiently long to eliminate back diffusion of air down the tube to the ports 7 and 8. Fick's Law states that the rate of diffusion is proportional to the concentration gradient. Thus at some region in a long tube the concentration gradient will produce a diffusion rate which is equal to the linear flow in the opposite direction. Beyond this region, and provided that the tube length and carrier gas flow are sufficiently large, no air can diffuse from the open ends into the portion of the tube between the ports 7 and 8.

In cases where it is necessary to employ a large diameter tube to accommodate the containers to be tested for leaks, a high carrier gas flow rate would be required to prevent diffusion of air into the portion of the tube between the ports 7 and 8. Further, turbulence could cause gas from the region between the ports 7 and 8 to escape from the open ends of the tube and this escaping gas could include the gas leaking from the container and which is required to be introduced into the detector. To overcome this a shutter or screen 11 can be fitted within the tube and conveniently adjacent the ports 7 and 8. The shutters or screens adjustably close the ends of the portion of the tube immediately adjacent and between the ports 7 and 8 and are suitably arranged or mounted, as diagrammatically indicated at 12, such as to allow a container to pass into and out of the tube portion but do not completely seal the portion from the outer ends of the tube.

In an alternative arrangement where large leaks are suspected in the containers, a supply of clean air can be used as a carrier gas and only a small fraction of this air which is extracted through the ports 4 is admitted into the detector. This can be achieved, for example, in a manner as disclosed in U.S. Pat. Nos. 3,585,845 and 3,699,342. The clean air within the tube also serves to prevent any contaminants which might be present in the atmospheric air from entering the detector.

In the drawing the containers are shown being carried through the tube by the conveyor 2. Alternatively, the containers can fall freely through the tube with the latter inclined at a suitable angle to the horizontal. Upon entry into the tube each container is swept by a flow of carrier gas moving in a direction opposite to that of the container. This tends to remove any gaseous contaminants from the surface of the container. When the container enters the tube portion between the ports 7 and 8 any gas leaking therefrom is swept by the carrier gas into the detector. The response from the detector can be utilised to initiate a device 13 for separating faulty containers from the remainder of the containers passing through the tube.

When the containers are not pressurised or where it is desirable to increase the pressure within the containers in order to detect leaks the tube 3 can be heated. This will increase the temperature and hence the pressure within each container as it passes through the tube. The tube can be heated, for example, by an external heating coil 15.

The tube geometry is not limited to circular cross-section. Indeed the tube can be any convenient shape in section. Further the tube can be provided with a single port at each of the locations 4, 7 and 8 in the drawing to replace the plurality of ports.

We claim:

1. A method of leak testing sealed containers comprising establishing an atmosphere of a carrier gas within an intermediate portion of an open ended, elongate chamber remote from both open chamber ends, passing a succession of said containers through the length of the chamber, and introducing carrier gas together with any gaseous leakage from each container as it passes through said intermediate portion from said intermediate portion into a detector sensitive to the leakage.

2. A method according to claim 1 which comprises arranging screens to non-sealingly and adjustably close both ends of the chamber intermediate portion.

3. A method according to claim 1 which comprises heating at least said intermediate portion of the chamber to increase the temperature and hence the pressure within each container passing therethrough.

4. A method according to claim 1 in which said establishing step includes (1) introducing said carrier gas into said chamber at both ends of an intermediate chamber portion at first and second inlets spaced longitudinally oppositely from said detector and spaced longitudinally inboard from corresponding open ends of said chamber and (2) channeling partial flows of said introduced carrier gas from said first and second inlets respectively out each end of said chamber to bar entry of environmental gases to said intermediate chamber portion and (3) channeling longitudinally opposed and colliding further partial flows of said carrier gas toward the center of said intermediate chamber portion over leading and trailing ends respectively of each container passed through said intermediate chamber portion to sweep therewith any leakage from said container toward said detector; and in which said passing step includes moving said succession of containers in spaced relation unidirectionally from end to end through said elongate chamber and in sequence past said first carrier gas inlet, detector, and second carrier gas inlet.

5. A method according to claim 4 including the step of heating said intermediate portion of said chamber between said first and second carrier gas inlets, the further step of positively conveying said containers on a conveyor extending longitudinally through said chamber and the further step of movably locating nonsealing gas screens outboard of said first and second carrier gas inlets and through which said conveyor extends for admitting said containers to and permitting exit of said containers from said intermediate chamber portion.

6. An apparatus for leak testing sealed containers comprising an elongate chamber open at both ends, an outlet port from the chamber situated at a position remote from and intermediate the chamber ends, a leak sensitive detector for sensing leakage from the containers and in communication with the outlet port and first and second carrier gas inlet ports remote from the chamber ends and spaced oppositely from the outlet port to create an uninterrupted atmosphere of carrier gas over the intermediate portion of the chamber between the carrier gas inlet ports.

7. An apparatus according to claim 6 including means for positively conveying containers to be tested through the chamber.

8. An apparatus according to claim 6 including means for rejecting leaking containers identified by the detector from the remaining containers emerging from the chamber.

9. An apparatus according to claim 6 including means for heating the chamber whereby to increase the temperature and hence the pressure within containers passing through the chamber.

10. An apparatus according to claim 6 including an adjustable screen disposed within the chamber adjacent each carrier gas inlet port to non-sealingly isolate the portion of the chamber between the inlet ports from the end portions thereof.

11. An apparatus according to claim 10 including means defining an elongate conveyor extending longitudinally through said elongate chamber past (1) a first said carrier gas inlet port and screen, (2) said detector, and (3) a second said carrier gas inlet port and screen for positively conveying said containers in spaced relation thereon sequentially past said elements (1), (2) and (3) while said container is subjected to repeated alternations of carrier gas flow therepast.

12. An apparatus according to claim 4 in which the spacing of the outlet port from the carrier gas inlet ports is about three to four chamber diameters, said carrier gas inlet ports each being spaced from the adjacent open end of the elongate chamber sufficiently to prevent back diffusion of environmental air through the chamber ends to the inlet ports.

13. An apparatus according to claim 12 in which the length of said elongate chamber is at least in order of magnitude greater than its internal diameter.

14. An apparatus according to claim 6 including means supplying carrier gas to said carrier gas inlet ports at a rate for providing (a) diverging net flows of carrier gas out each open end of said chamber and (b) further, converging flows of carrier gas, free of contamination by the environmental air outside chamber, past opposite ends of said container and to said detector.

15. An apparatus according to claim 14 including means moving successive containers into said chamber through one said open end thereof and against and through an outward carrier gas flow from the adjacent first carrier gas inlet port for removing any gaseous contaminants from the surface of such container prior to movement of said container into said intermediate portion of said chamber.

16. An apparatus for continuously testing, in a carrier gas, a succession of sealed containers for leaks, comprising in combination;

an elongate chamber open at opposite ends for loosely receiving a succession of spaced, sealed containers longitudinally therethrough for individual leak testing, said chamber being substantially open to gas movement longitudinally therethrough, said chamber having an elongate detection zone intermediate its ends and flanking elongate container input and output zones extending therefrom toward respective but remote ends of the chamber;

a leak sensitive detector connected to an outlet port from said chamber at a point longitudinally spaced intermediate the ends of said elongate detection zone;

first and second inlet means for (a) providing respective first and second flows of carrier gas toward each other from the ends of said detection zone over a container in such detection zone and conveying leakage gas therefrom through said outlet to said detector, and (b) supplying third and fourth flows of carrier gas away from each other outwardly through said input and output zones respectively to eliminate back diffusion of air through the open chamber ends to said detection zone;

means extending longitudinally through said chamber for directly controlling unidirectional movement of said sealed containers through said chamber to pass individual ones of said containers sequentially through said detection zone.

* * * * *